Patented May 4, 1954

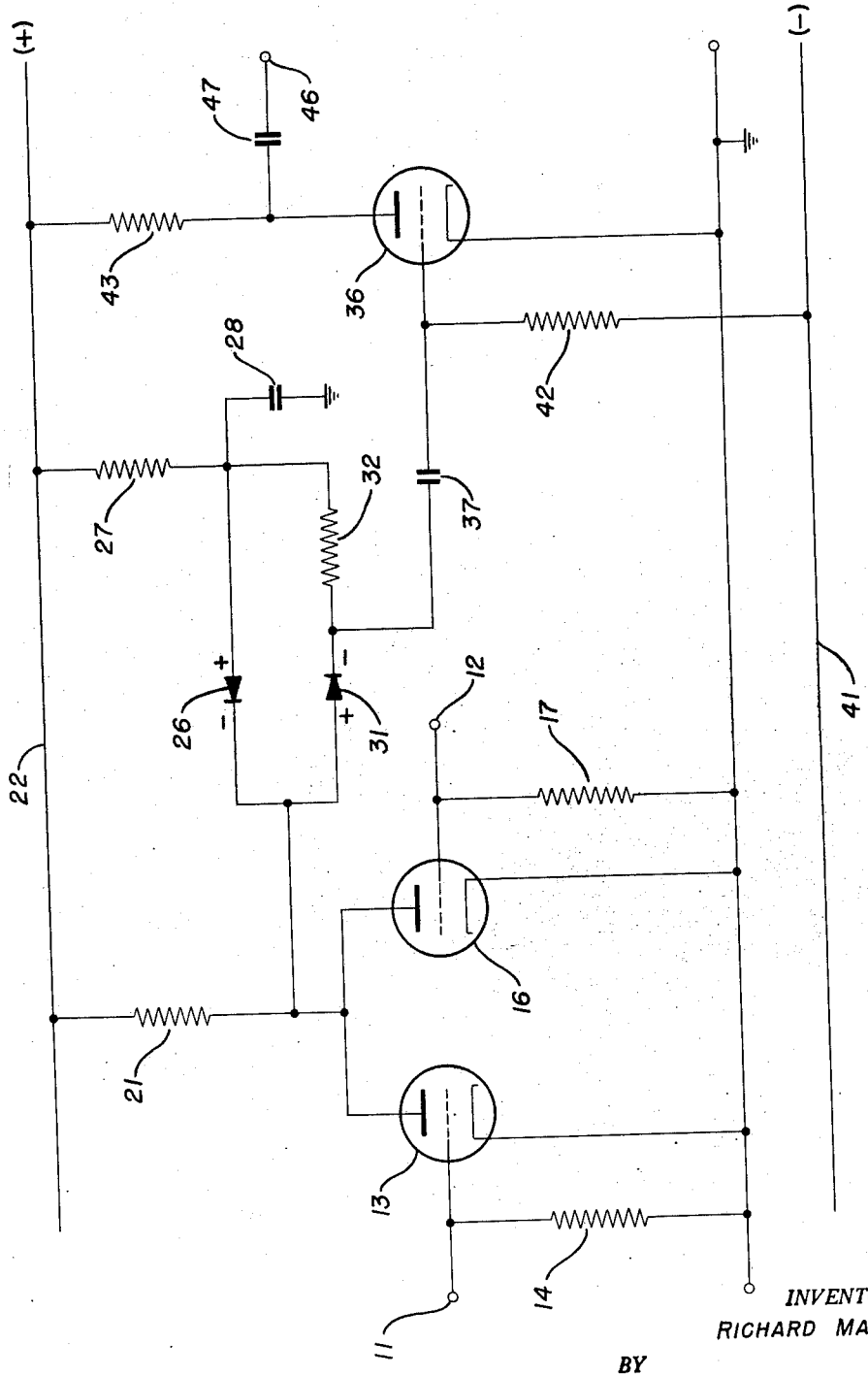

2,677,759

UNITED STATES PATENT OFFICE 2,677,759

COINCIDENCE CIRCUIT

Richard Madey, Berkeley, Calif., assignor to the United States of America as represented by the United States Atomic Energy Commission Application February 19, 1953, Serial No. 337,855

3 Claims. (Cl. 250—27)

The present invention relates to a coincidence circuit and more particularly to an improved fast coincidence circuit which is highly discriminatory with respect to single pulses.

Many types of coincidence circuits have been developed for use with nuclear counting equipment; however, with the increasing use of scintillation counting methods it is necessary to have circuits capable of handling pulses with a duration of substantially $2 \times 10^{-8}$ second. In order to accomplish the foregoing many problems, which may be solved simply or do not occur in circuits for pulses of longer duration, must be approached in a new manner.

In a coincidence circuit such as discussed in the foregoing, it is desirable to discriminate against non-coincidence pulses and also against pulses which are in coincidence but have values less than a certain predetermined level. Known coincidence circuits are capable of accomplishing the former type of discrimination, but fail to provide a sufficient degree of discrimination of the latter type.

It is therefore an object of the present invention to provide a new and improved coincidence circuit.

Another object of the invention is to provide a coincidence circuit which reliably resolves pulses of substantially $2 \times 10^{-8}$ second duration.

A further object of the invention is to provide a coincidence circuit having an improved discrimination ratio.

Still another object of the invention is to provide a coincidence circuit which will reject single pulses and only pass a pulse to the output when coincidence pulses having a selected magnitude occur.

A further object of the invention is to provide a simple coincidence circuit which employs only conventional circuit elements.

Other objects and advantages of the invention will be apparent in the following description and claims considered together with the accompanying drawing, which is a schematic circuit diagram of the invention.

Considering the invention in detail, there is provided a first input terminal 11 and a second input terminal 12. The first input terminal 11 is connected to the control grid of a triode type tube 13 and to ground through a resistor 14. The second input terminal 12 is, similarly, connected to the control grid of a second triode type tube 16 and to ground through a resistor 17. To combine the operation of the tubes 13 and 16 the cathode of each tube is directly connected to ground and the anode of each is directly connected to the other. The necessary positive operating voltage for the tubes 13 and 16 is supplied by connecting a dropping resistor 21 between the anodes of the tubes and a positive bus 22 carrying a suitable value of voltage with respect to ground.

The negative terminal of a crystal diode 26 is connected to the anodes of the tubes 13 and 16 and the positive terminal is connected through a second dropping resistor 27 to the positive bus 22. The junction between the crystal 26 and the resistor 27 is coupled to ground through a storage capacitor 28. Such latter connections serve as a clamping circuit which suppresses changes at the anodes of the tubes 13 and 16 because of a negative input pulse at only one of the tubes.

The positive terminal of a second crystal diode 31 is connected to the negative terminal of the crystal diode 26 and the negative terminal of the former is connected to the positive terminal of the latter through a resistor 32. The junction between the second crystal 31 and the resistor 32 is coupled to the control grid of an output tube 36 by a coupling capacitor 37. Further connections of the output tube 36 include a connection from the control grid to a voltage bus 41, which is negative in value with respect to ground, through a resistor 42; a connection from the cathode directly to ground; and from the anode to the positive bus 22 through a dropping resistor 43. As an output for the circuit a terminal 46 is coupled to the anode of the output tube 36 through a coupling capacitor 47.

Consider now the operation of the circuit with the voltage busses 22 and 41 suitably energized, but with the input terminals 11 and 12 disconnected. Under such condition the two tubes 13 and 16 are conductive and the anode voltage is at a minimum so that the impressed grid bias maintains the output tube 36 in a nonconductive or, preferably, in a low level conducting state. When tubes 13 and 16 are conductive, the tube current flows partially through each of the dropping resistors 21 and 27. The value of the first resistor 21 is selected to be greater than that of the second resistor 27, so that a greater value of current flows through the latter resistor. Under such conditions the crystal diode 26 is biased so that the capacitor 28 charges substantially to the anode voltage of the tubes 13 and 16. It is to be noted that the crystal diodes 26 and 31 are unidirectional devices and are selected to have a low value of resistance, for example 20 ohms, in the forward direction.

Now with the input terminals 11 and 12 respectively connected to separate sources of negative pulses, which may be photomultiplier tubes, the operation of the circuit will be considered at a time when a negative pulse occurs concurrently at the control grid of each tube 13 and 16 with sufficient value to render both tubes nonconductive. Such circumstance results in the anode voltage of the tubes 13 and 16 increasing to a value such that the crystal diode 26 ceases to conduct. At the same instant the latter action occurs, the second crystal diode 31 becomes conductive and current flows through that branch of the circuit to charge the capacitor 28 to a higher value. The result of the foregoing is to raise the voltage of the control grid of the output tube 36 so that the tube conducts more heavily and a negative pulse appears at the output terminal 46.

It is to be noted that, as the voltage of the control grid of the output tube 36 increases, the control grid to cathode interelectrode capacitance becomes charged and maintains a higher than normal positive bias on the control grid for a time determined by the resistance path to ground. Thus there is provided a pulse lengthening action in the output voltage which is desirable because of the inherent characteristics of scaling circuits which are normally connected to follow the present circuit. At the termination of the pulses at the input terminals 11 and 12 the circuit is returned to its original state.

To illustrate the discriminatory ability of the circuit as to other than coincidence pulses at the input terminals 11 and 12, the operation thereof will be set forth to consider input pulses having values below the cut-off values of the tubes 13 and 16. Such pulses result in less current flowing through the two anode dropping resistors 21 and 27, but not by a sufficient amount to cause non-conductance of the crystal diode 26. From the foregoing it will then be apparent that there will be no change in the operation of the output tube 36 and therefore no negative output pulse at the output terminal 46.

The circuit operates in a similar manner to discriminate against noncoincident input pulses; that is, when one of the input tubes 13 and 16 is cut off the change in current flow is not sufficient to result in the nonconductance of the crystal diode 26 so that no pulse is delivered to the tube 36 to alter the condition thereof. There is therefore no change at the output terminal 46.

From the foregoing description of operation of the circuit under differing conditions, it will be apparent that the coupling network between the input tubes 13 and 16 and the output tube 36 affords a highly efficient discriminatory circuit between coincident and noncoincident pulses, and even between coincident pulses having a magnitude sufficient to render both input tubes non-conductive and those having a lesser magnitude. During the time that the crystal diode 26 is conducting, the resistance thereof is low so that variations in the anode voltage, other than those due to the nonconductance of both tubes 13 and 16, have a low resistance path to ground through the capacitor 28. The path comprising the second crystal diode 31 and resistor 32, which is connected in parallel with the crystal diode 26, assures that only coincident pulses having values which cut off both input tubes 13 and 16 will be passed to the output tube 36.

The following is a typical set of values, for the circuit elements of the invention, which has been found to give excellent results, but which should not be construed as limiting in any manner.

13 tube, type 5687
14 resistor, 125 ohms
16 tube, type 5687
17 resistor, 125 ohms
21 resistor, 2,000 ohms
26 crystal, IN56
27 resistor, 1,300 ohms
28 capacitor, 16 microfarads
31 crystal, IN56
32 resistor, 1,800 ohms
36 tube, 6AH6
37 capacitor, 0.01 microfarad
42 resistor, 20,000 ohms
43 resistor, 1,800 ohms
47 capacitor, 0.01 microfarad While the salient features of the present invention have been described in detail with respect to one embodiment it will, of course, be apparent that numerous modifications may be made within the spirit and scope of this invention, and it is therefore not desired to limit the invention to the exact details shown except insofar as they may be defined in the following claims.

What is claimed is:

1. In a coincidence circuit, the combination comprising a plurality of input tubes having the anodes and cathodes respectively connected together, an output tube, potential means for applying operating voltages to said tubes, a first dropping resistor connected between the anodes of said input tubes and the positive side of said potential means, a second dropping resistor and a capacitor connected in series between the positive side of said potential means and the cathodes of said input tubes, a first unidirectional device connected between the anodes of said input tubes and the junction between said second dropping resistor and capacitor and being conductive when either or both of said input tubes are conductive, a second unidirectional device connected in parallel with said first unidirectional device and being conductive only when said input tubes are nonconductive, and coupling means connected between said second unidirectional device and the control grid of said output tube.

2. In a coincidence circuit, the combination comprising a plurality of input tubes having the anodes and cathodes respectively connected together, an output tube, potential means for applying operating voltages, a first dropping resistor connected between the anodes of said input tubes and the positive side of said potential means, a second dropping resistor and a capacitor connected in series between the positive side of said potential means and the cathodes of said input tubes, a first crystal diode having the negative terminal thereof connected to the anodes of said input tubes and the positive side thereof connected to the junction between said second dropping resistor and capacitor, a series-circuit including a second crystal diode and a resistor connected in parallel with said first crystal diode with the positive terminal of the second crystal diode connected to the negative terminal of the first crystal diode, and a coupling capacitor connected between junction of said second crystal diode and resistor and the control grid of said output tube whereby an output pulse is developed only when negative voltages of sufficient value to render all of said input tubes nonconductive are impressed at the respective control grids thereof.

3. The combination of claim 2 further characterized by providing said first dropping resistor with a higher value of resistance than said second dropping resistor.

References Cited in the file of this patent

UNITED STATES PATENTS

| Number | Name | Date |
|---|---|---|
| 2,632,104 | Lakatos | Mar. 17, 1953 |